United States Patent
Golborn

[11] 3,854,989
[45] Dec. 17, 1974

[54] PROCESS FOR IMPARTING FLAME RESISTANCE TO TEXTILE MATERIAL

[76] Inventor: Peter Golborn, Lewiston, N.Y.

[73] Assignee: Hooker Chemical Corporation, Niagara Falls, N.Y., a Corp. of New York

[22] Filed: Dec. 1, 1972

[21] Appl. No.: 311,177

Related U.S. Application Data

[62] Division of Ser. No. 155,296, June 21, 1971.

[52] U.S. Cl. ............. 117/136, 106/15 FP, 117/141, 117/143 R, 260/952, 260/971, 260/DIG. 24
[51] Int. Cl. ........................ C09k 3/28, C09d 5/18
[58] Field of Search ............ 117/136, 143 A, 143 R, 117/141; 260/952, 971, DIG. 24; 106/15 FP; 252/8.1; 161/403

[56] References Cited
UNITED STATES PATENTS

| | | | |
|---|---|---|---|
| 2,867,597 | 1/1959 | Costello et al. | 117/136 X |
| 3,468,982 | 9/1969 | Klein et al. | 260/941 |

FOREIGN PATENTS OR APPLICATIONS

189,849  12/1966  U.S.S.R.

OTHER PUBLICATIONS

Bentrude et al., J. Am. Chem. Soc., Vol. 90, No. 21, pgs. 5924–5926 (1968).

*Primary Examiner*—Harry J. Gwinnell
*Attorney, Agent, or Firm*—Peter F. Casella; Donald C. Studley; William J. Crossetta, Jr.

[57] ABSTRACT

Compounds of the formula:

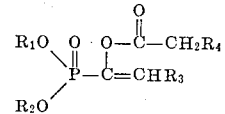

in which
  $R_1$ and $R_2$ are alkyl groups;
  $R_3$ is —H or an alkyl group; and
  $R_4$ is —H, —Cl or an alkyl group are produced by acylating a dialkyl acyl phosphonate under conditions of either acid or base catalysis with an alkanoic acid anhydride, halide or a mixture thereof. The dialkyl 1-alkanoyloxy-alk-1-enyl-phosphonates of this invention are useful as flame retarding agents for textile materials and in the production of polymers and copolymers which possess flame retardant properties.

5 Claims, No Drawings

PROCESS FOR IMPARTING FLAME RESISTANCE TO TEXTILE MATERIAL

This is a division of application Ser. No. 155,296, filed June 21, 1971.

BACKGROUND OF THE INVENTION

Dialkyl (carboalkoxyalkyl) alkenyl phosphonates have been employed as homopolymers and copolymers in molded fire retardant articles (U.S. Pat. No. 3,468,982).

BRIEF DESCRIPTION OF THE INVENTION

This invention provides a novel group of flame retardants for textile materials which are dialkyl 1-alkanoyloxy-alk-1-enyl phosphonates which are produced by acylating a dialkyl acyl phosphonate with an alkanoic acid anhydride, halide or mixture thereof under conditions of either acid or base catalysis. The phosphorus enol ester compounds of this invention are flame retarding agents for textile materials when used directly, or in the form of their homopolymers or copolymers with olefinically unsaturated compounds.

DETAILED DESCRIPTION OF THE INVENTION

In accordance with this invention, there is provided flame retardant compounds for textile materials which compounds are dialkyl 1-alkanoyloxy-alk-1-enyl phosphonates of the formula:

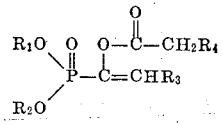

wherein $R_1$, $R_2$ and $R_3$ are independently lower alkyl groups of one to eight carbon atoms; and $R_4$ is selected from the group consisting of —H, —Cl and lower alkyl groups of one to eight carbon atoms.

As an additional aspect of this invention, there is provided a process for imparting flame resistance to a textile material which comprises combining a flame retardant amount of a compound of the formula:

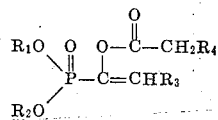

wherein $R_1$ and $R_2$ are independently lower alkyl groups of one to eight carbon atoms;

$R_3$ is —H or a lower alkyl group of one to eight carbon atoms; and $R_4$ is —H, —Cl or a lower alkyl group of one to eight carbon atoms with a textile selected from the group consisting of a cellulosic material and a proteinaceous material. Thus, the compounds of this invention impart flame resistance to textile materials when incorporated into a textile in from about 5 to about 40 percent by weight of the textile material. The resulting composition of matter comprises a cellulosic or proteinaceous material containing from 5 to about 40 weight percent of the flame retardant of this invention.

The compounds of this invention are readily produced by acylating a dialkyl acyl phosphonate under conditions of acid or base catalysis to afford the enol ester product thusly:

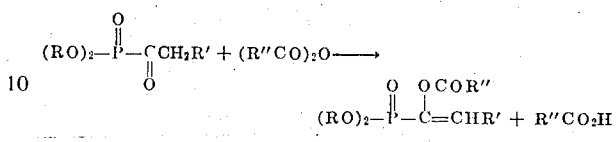

The acylating agent may be a conventional acylating agent such as a carboxylic acid chloride or a mixture of a mix acid halide and an acid anhydride possessing the same acyl group, rather than the anhydride depicted in the equation. Since the by-product of the acylation reaction in which an alkanoic acid anhydride is used as the acylating reactant is an alkanoic acid which may otherwise interfere in the reaction, it is preferred to employ the corresponding alkanoic acid chloride with the anhydride to convert any alkanoic acid produced back to the anhydride with the formation of HCl as the by-product of the latter reaction. Under these conditions, the product yields are decidedly enhanced over that obtained when the anhydride or acid chloride is used alone.

The dialkyl acyl phosphonate starting compounds for the process of this invention are derived in known manner by the reaction of a trialkyl phosphite with either an alkanoic acid chloride or an alkanoic ac anhydride. Thus, the compounds of this invention may be produced directly from the tri-alkyl-phosphite if desired.

The acylation reaction of this invention proceeds without a solvent although decomposition of the reactants and products as well as polymerization of the vinyl unsaturated product will occur to some degree. Therefore, to minimize complications, it is preferred to employ a diluent during the reaction. Toluene has been employed as an acceptable reaction solvent medium. Similar non-polar or slightly polar solvents such as benzene, xylene and ethylbenzene may be employed if desired.

Various catalysts have been found to affect the reaction beneficially. These catalysts are para-toluene sulfonic acid, zinc borate, triethyl amine, tetrabutyl orthotitanate, perchloric acid, aluminum chloride, zinc chloride, boron trifluoride-etherate, sulfuric acid and sodium acetate. Thus, the catalysts may be either acidic or basic.

The production of phosphorus enol esters as applied to the disclosed invention proceeds under conditions common for reaction of the specific acrylating agent, generally at from room temperature to about 200° C. although it may be advisable to initially cool the reagents during addition of a catalyst such as triethylamine, which will readily react with an acyl halide. Generally, the reaction is preferably conducted at the reflux temperature of any solvent that may be employed, thus a preferred temperature range for the reaction lies between about 80° to about 160° C. The reaction pressure may vary from atmospheric pressure to super-atmospheric pressures and sub-atmospheric pressures, the latter condition being employed when it is desired to remove the elimination product of the gemdiacyloxy reaction intermediate from a neat reaction mixture. The time for completion or near completion of the reaction will vary with the reactants and reaction conditions, but normally the reaction is substantially completed in from 1 to 12 hours although 24 hours or more may elapse before completion of the reaction if performed under very mild conditions. Either a normal air atmosphere or a nitrogen or argon atmosphere may be employed during the reaction.

The reaction mixture, after completion of the reaction, is treated with a reagent to effectively neutralize the acylating agent as a first step in product recovery. For example, if acetyl chloride was used as the acylating agent, an excess of methanol may be added to the final reaction product to esterify (effectively neutralize) any excess acid chloride. Then the desired product may be recovered by extraction and/or fractional distillation.

The compounds of this invention may be applied to a textile material by conventional finishing techniques such as by thermal or radiation induced pad curing. The finished textile product, whether it is subjected to additional finishing treatments or not, exhibits reasonably durable, flame resistant properties. Application to the textile in an amount between about 5 to about 40 percent by weight of the flame retardant based upon the textile weight is sufficient to protect the material treated.

The flame retarding agents of this invention may be applied to various textiles such as cellulosic materials and proteinaceous materials. By cellulosic materials, applicant means to embrace cotton, rayon, regenerated cellulose and cellulose derivatives which retain the cellulose backbone and at least one hydroxyl group per repeating glucose unit. By proteinaceous material applicant intends to embrace those textile materials which contain the functional groups of protein, such as wool.

In addition to the direct application of the monomeric compounds of this invention to a textile material, they may be homo- or co-polymerized to afford relatively low molecular weight polymers which possess flame retardant characteristics suitable for many applications both with textile materials as well as in castings, moldings, foams and laminates for use in the construction industry in the form of wall coverings and panels or electric system conduits and castings.

The copolymers of special interest are derived from the monomers of the instant invention and olefinically unsaturated compounds such as ethylene, propylene, styrene, butadiene, acrylic acid, acrylonitriles, acrylates, acrylamides, vinyl acetate, vinyl alcohol, vinyl chloride, vinylidene chloride, etc. and mixtures thereof such as acrylonitrile-butadiene-styrene. The copolymers possess flame retardant properties rendering them suitable for use by incorporation into other polymer blends as well as for direct treatment of a textile material. The polymerization of the monomers of this invention procedes in the presence of a Lewis acid by a cationic mechanism. Copolymerization of the compounds of this invention is readily conducted by conventional techniques employing free radical initiating reagents such as the organic peroxides, azo compounds and ionizing irradiation.

Examples 1–10 illustrate various preparative techniques employed in the production of the compounds of this invention. Examples 11–14 illustrate the fire retarding activity of the compounds of this invention, employed alone and in conjunction with olefinic monomers with which free radical polymerization affords a copolymer presenting flame retarding activity in the presence of various textile materials.

EXAMPLE 1

A 500 milliliter round bottomed flask was charged with 90 grams (0.5 mole) diethyl acetylphosphonate, 150 grams (1.5 moles) acetic anhydride and 2.5 grams p-toluene sulfonic acid. The reaction mixture was heated under nitrogen at 130° to 140° C. for 12 hours, then it was cooled and poured into 2 liters, 30 percent weight/weight aqueous sodium bicarbonate solution. This mixture was extracted with three 500 milliliter portions of benzene, the benzene extracts were combined and dried over anhydrous magnesium sulfate. Removal of the benzene by stripping at 70° C. under about 20 millimeters mercury absolute gave 40 grams amber liquid. On distillation, the amber liquid yielded 264 grams diethyl-1-acetoxy vinylphosphonate exhibiting a boiling point of 75° to 80° C. under 0.2 to 0.3 millimeters of mercury and a refractive index of $n_D^{25}$ 1.4380.

Calculated—C, 43.2; H, 6.8; P, 13.9
Found—C, 43.4; H, 7.0; P, 13.5

EXAMPLE 2

62.4 grams (0.3 mole) di-isopropyl acetylphosphonate, 80.4 grams (0.8 mole) acetic anhydride and 2.5 grams p-toluene sulfonic acid were placed in a 500 milliliter round bottomed flask and heated under nitrogen at 110° C. for 6 hours. 100 milliliters methanol was then added over a period of 1 hour to the reaction mixture which was then refluxed for 2 hours. After the reflux period, the reaction was stripped at 70° C. under a vacuum of about 15 millimeters mercury to yield 70 grams brown liquid. This liquid was poured into a slurry of 20 grams sodium bicarbonate and 100 milliliters water and the resulting mixture was extracted with two 200 milliliter portions of benzene. The benzene extracts were dried over anhydrous sodium sulfate and the benzene removed by distillation to give 47 grams liquid. Distillation of this liquid yielded 10.7 grams di-isopropyl-1-acetoxyvinylphosphonate, boiling point 108° to 117° C. under 2 -3 millimeters mercury and $n_D^{25}$ 1.4333.

Calculated—C, 48.0; H, 7.7; P, 12.4
Found—C, 47.9; H, 8.0; P, 12.3

EXAMPLE 3

A 2 liter round bottomed flask was charged with 582 grams (3.0 moles) diethyl propionylphosphonate, 705 grams (7.0 moles) acetic anhydride and 25 grams p-toluene sulfonic acid. The reaction mixture was heated for 20 hours at 120° C. then 250 milliliters methanol was added and the reaction mixture refluxed for 2 hours, then cooled and poured into a slurry of 500 grams sodium bicarbonate and 2 liters water. The mixture was extracted with two 500 milliliter portions of benzene and 500 milliliters ethyl acetate. The combined organic extracts were dried over anhydrous magnesium sulfate then vacuum stripped at 70° C. under about 15 millimeters mercury to give 503 grams crude product. Purification by vacuum distillation gave 413.4 grams diethyl-1-acetoxypropenyl phosphonate, boiling point 97° to 111° C. under 0.2 to 0.4 millimeter mercury absolute.

Calculated—C, 45.7; H, 7.3; P, 13.1

Found—C, 45.5; H, 7.4; P, 12.9

EXAMPLE 4

92 grams (0.5 mole) diethyl propinylphosphonate, 150 grams (1.5 moles) acetic anhydride and 10 grams tetrabutyl orthotitanate were placed in a 500 milliliter round bottomed flask. The reaction mixture was heated under nitrogen at 120° C. for 24 hours then 150 milliliters methanol was added and the reaction mixture refluxed for 1.5 hours. The cooled reaction mixture was poured onto a slurry of 250 grams sodium bicarbonate and 1 liter water. The mixture was extracted with 500 milliliters benzene and 500 milliliters ethyl acetate. The combined organic extracts were dried over anhydrous magnesium sulfate and the organic solvents removed by distillation to give 72 grams liquid which on vacuum distillation from 2 grams hydroquinone yielded 28.7 grams diethyl-1-acetoxypropenyl phosphonate boiling at 112° to 124° C. under 1.0 to 1.3 millimeters mercury and $n_D^{25}$ 1.4395.

EXAMPLE 5

A 2 liter round bottomed flask was charged with 360 grams (2.0 moles) diethyl acetylphosphonate, 512 grams (5.0 moles) acetic anhydride, 25 grams p-toluene sulfonic acid and 500 milliliters toluene. The reaction mixture was refluxed under nitrogen at about 120° C. for 4.5 hours, then 173 grams (2.2 moles) acetyl chloride was added to the reaction mixture over a period of 0.75 hour. On completion of the addition, the reaction mixture was refluxed at about 98° C. for 14.5 hours then stripped at 70° C. under 15 millimeters mercury. The residue was poured onto a slurry of 250 grams sodium bicarbonate and 1 liter water and the mixture extracted with two 500 milliliter portions of benzene. The combined benzene extracts were dried over anhydrous magnesium sulfate and then the benzene was removed by distillation to give 390 grams liquid which on vacuum distillation yielded 263.5 grams diethyl-1-acetoxy-vinylphosphonate boiling at 79° to 88° C. under 0.05 to 0.1 millimeter mercury and $n_D^{25}$ 1.4380.

Calculated—C, 43.2; H, 6.8; P, 13.9
Found—C, 42.7; H, 6.7; P, 13.6

EXAMPLE 6

A 1 liter round bottomed flask was charged with 90 grams (0.5 mole) diethyl acetylphosphonate, 86 grams (1.1 moles) acetyl chloride, 10 grams p-toluene sulfonic acid and 250 milliliters toluene. The reaction mixture was refluxed under nitrogen for 23 hours then stripped of volatile materials at 70° C. under about 15 millimeters mercury to given 111 grams pale yellow liquid which was poured onto a slurry containing 50 grams sodium bicarbonate and 250 milliliters water. The resulting mixture was extracted with two 250 milliliter portions of benzene. The combined benzene extracts were dried over anhydrous magnesium sulfate and then stripped at 70° C. under 15 millimeters mercury to give 92 grams colorless liquid. In distillation, 53.8 grams diethyl-1-acetoxy vinylphosphonate was obtained, boiling point 76° to 93° C. under about 0.4 millimeter mercury and $n_D^{25}$ 1.4382.

Calculated—C, 43.2; H, 6.8; P, 13.9
Found—C, 43.3; H, 6.9; P. 13.6

EXAMPLE 7

194 grams (1.0 mole) diethyl propinylphosphonate, 86 grams (1.1 moles) acetyl chloride, 2 grams zinc borate and 250 milliliters toluene were placed in a 1 liter round bottomed flask. The reaction mixture was refluxed under nitrogen for 12 hours then stripped at 70° C. under about 15 millimeters mercury to give 214 grams yellow liquid which was poured onto a slurry of 100 grams sodium bicarbonate and 250 milliliters water. The mixture was extracted with two 250 milliliter portions of benzene. Combined benzene extracts were dried over anhydrous magnesium sulfate then stripped at 70° C under about 15 millimeters mercury to give 130.5 grams colorless liquid which on vacuum distillation yielded 108.9 grams diethyl-1-acetoxy propenylphosphonate, boiling at 108° to 111° C under 0.6 millimeter mercury and $n_D^{25}$ 1.4422.

Calculated—C, 45.8; H, 7.3; P, 13.1
Found—C, 45.0; H, 7.4; P, 13.2

EXAMPLE 8

A 2 liter round bottomed flask was charged with 180 grams diethyl acetylphosphonate, 86 grams (1.1 moles) acetyl chloride and 500 milliliters toluene. The reaction mixture was cooled to about 10° C. with an ice bath and 111 grams (1.1 moles) triethylamine was added dropwise over 1 hour. In completion of the addition, the reaction mixture was refluxed for 3.0 hours, then cooled and filtered to give 126 grams triethylamine hydrochloride. The filtrate was washed with three 500 milliliter portions of water. The organic layer was dried over anhydrous magnesium sulfate then stripped at 70° C under about 15 millimeters mercury to give 120 grams brown liquid which contained 84 grams diethyl-1-acetoxy vinylphosphonate as assayed by gas chromatography.

EXAMPLE 9

The reaction of Example 8 is repeated with the exception that the acylating agent is chloroacetyl chloride. The product diethyl-1-chloroacetoxy vinylphosphonate is obtained by cooking up the reaction mixture in the manner set forth in Example 8.

EXAMPLE 10

The procedure of Example 2 is repeated, with the exception that di-octyl acetylphosphonate is employed as the initial reactant. The product is recovered in the manner presented to afford a small yield of the desired product which is separated from impurities by fractional distillation.

EXAMPLE 11

A sample of cotton sheeting, 5.0 ounces per square yard, was impregnated with a methanolic solution containing 50 grams diethyl-1-acetoxy-vinylphosphonate per 100 grams of solution. The impregnated fabric was air dried and had a char length of 4.4 inches as measured by AATCC method 34-1966.

EXAMPLE 12

A sample of cotton sheeting, 5.0 ounces per square yard, was impregnated with a methanolic solution containing 25 grams diethyl-1-acetoxy vinylphosphonate per 100 grams of solution. After air drying, the treated fabric had a char length of 8.3 inches as measured by AATCC method 34-1966.

EXAMPLE 13

A sample of wool bedford cord of approximately 8.0 ounces per square yard was immersed in a solution of 66.6 grams diethyl-1-acetoxy vinylphosphonate, 29.4 grams maleic anhydride, 2 grams azobisisobutyronitrile and 50 milliliters benzene for 1 hour. After squeezing the fabric to remove excess solution, it was cured at 100° C. for 12 hours. The treated fabric showed an initial char of 3.5 inches and 5.2 inches after 5 home washes.

EXAMPLE 14

A sample of rayon staple fiber was immersed in an aqueous solution containing 15 grams sodium hydroxide per 100 grams solution for 10 minutes and then squeezed to about 60 percent wet pick-up and dried at 250° F. for 2 minutes. The sample was then immersed in a methanolic solution containing 50 grams diethyl-1-acetoxyvinylphosphonate per 100 grams of solution for 10 minutes and squeezed to remove excess solution. The sample was then cured at 330° F for 2.5 minutes, then rinsed in hot water and dried. The fiber was twisted tightly and held in a bunsen flame. Upon removal, the material was self-extinguishing. A sample not treated by the procedure described was completely consumed by the bunsen flame.

What is claimed is:

1. A flame resistant textile material comprising a textile material selected from the group consisting of cellulosic and proteinaceous material having applied thereto a flame retarding amount of a compound of the formula:

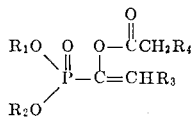

wherein
R₁ and R₂ are independently lower alkyl groups of one to eight carbon atoms;
R₃ is —H or a lower alkyl group of one to eight carbon atoms; and
R₄ is —H, —Cl or a lower alkyl group of one to eight carbon atoms.

2. The flame resistant textile material of claim 1 containing from 5 to 40 percent by weight of said compound based upon the weight of textile material.

3. The textile material of claim 1 wherein said compound is of the formula

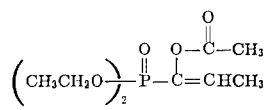

4. The textile material of claim 1 wherein said compound is of the formula

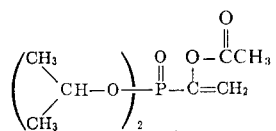

5. The textile material of claim 1 wherein said compound is of the formula

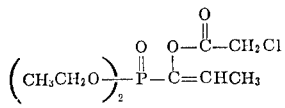

* * * * *